Figures 1, 2:
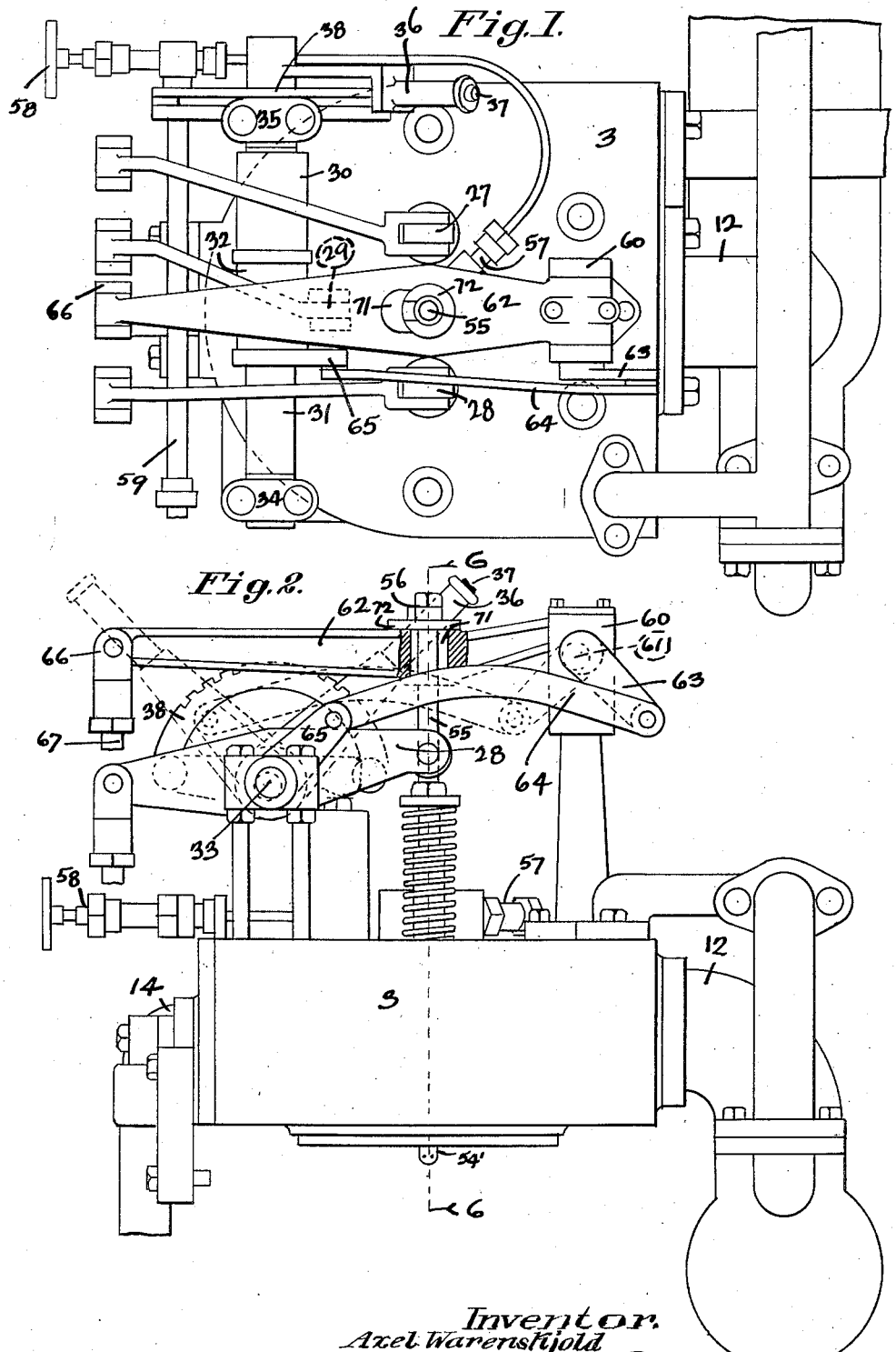

Dec. 4, 1923.

A. WARENSKJOLD 1,476,312

VALVE CONTROL FOR DIESEL ENGINES

Filed July 24, 1922   3 Sheets-Sheet 1

Inventor.
Axel Warenskjold
By Lincoln Johnson
Attorney.

Dec. 4, 1923.　　　　　　　　　　　　　　　　　　　　　　1,476,312
A. WARENSKJOLD
VALVE CONTROL FOR DIESEL ENGINES
Filed July 24, 1922　　　3 Sheets-Sheet 2
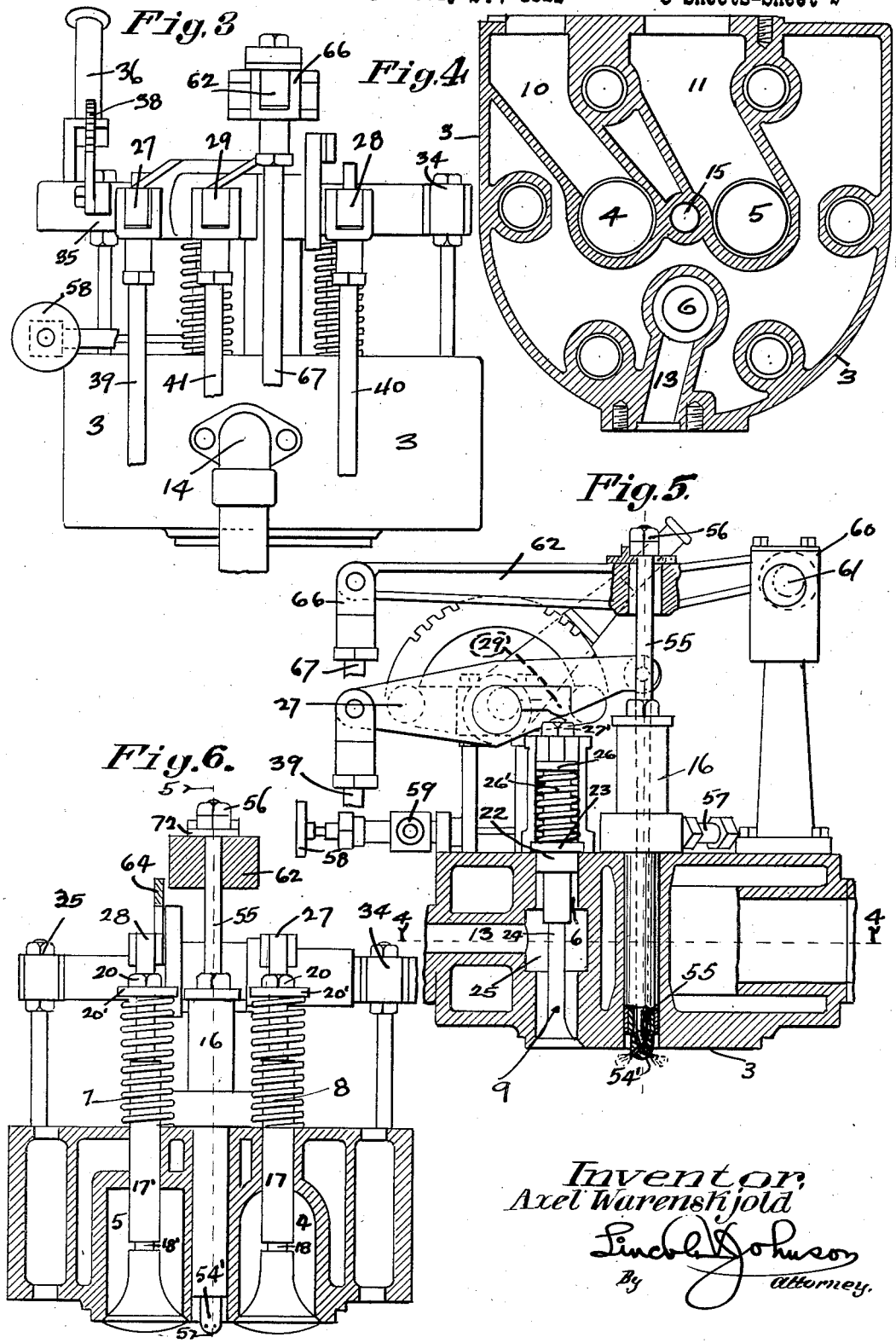
Inventor,
Axel Warenskjold
By Lincoln Johnson
Attorney.

Dec. 4, 1923.
A. WARENSKJOLD
1,476,312
VALVE CONTROL FOR DIESEL ENGINES
Filed July 24, 1922
3 Sheets-Sheet 3
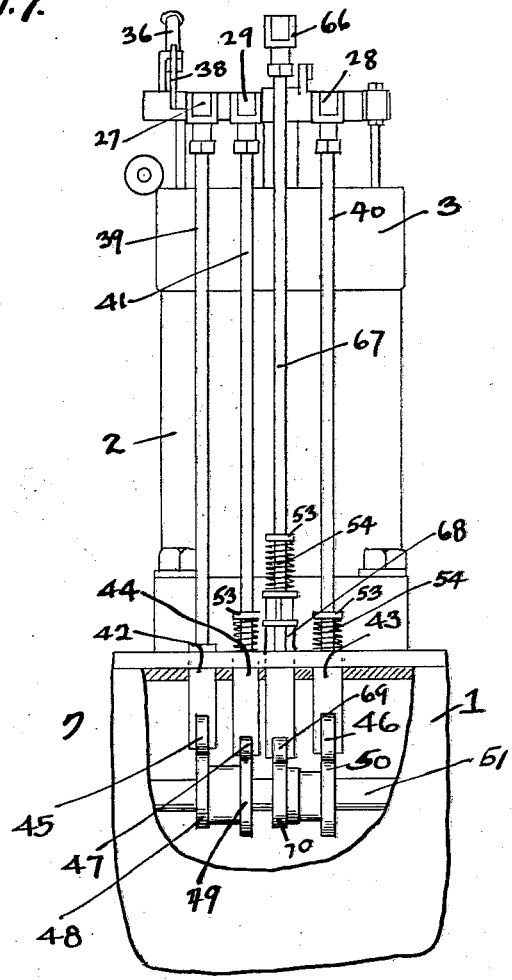
Fig.7.
Fig. 8.
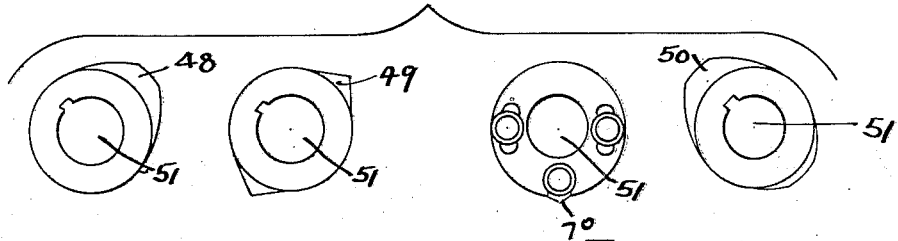
Inventor.
Axel Warenskjold
By Lincoln Johnson
Attorney.

Patented Dec. 4, 1923.

1,476,312

UNITED STATES PATENT OFFICE.

AXEL WARENSKJOLD, OF OAKLAND, CALIFORNIA, ASSIGNOR TO ATLAS IMPERIAL ENGINE COMPANY, OF OAKLAND, CALIFORNIA, A CORPORATION OF CALIFORNIA.

VALVE CONTROL FOR DIESEL ENGINES.

Application filed July 24, 1922. Serial No. 577,258.

*To all whom it may concern:*

Be it known that I, AXEL WARENSKJOLD, a citizen of the United States, and a resident of the city of Oakland, county of Alameda, State of California, have made a new and useful invention—to wit, Improvements in Valve Controls for Diesel Engines; and I do hereby declare the following to be a full, clear, concise, and exact description of the same.

This invention relates particularly to a mechanism for controlling the operation of the valves of an internal combustion engine of the Diesel type.

An object of the invention is to provide on a Diesel engine, in combination with the valves thereof, a mechanism for controlling the operation of said valves.

A further object of this invention is to provide valve operating means on a Diesel engine wherein the cycle of operation may be completed within one complete stroke of the piston of said engine or in two complete strokes.

A still further object of this invention is to provide means for controlling and operating the valves of an internal combustion engine whereby air intake, fuel discharge and exhaust valves in one cycle of operation may be made to move at one-half the operating speed of a compressed air inlet valve and exhaust valve of another cycle of operation. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying sheets of drawings, Fig. 1 represents a plan view of the head of a cylinder of an internal combustion engine constructed in accordance with my invention.

Fig. 2 is a side elevation of Fig. 1.
Fig. 3 is a front elevation of Fig. 1.
Fig. 4 is a plan section taken through Fig. 5 on the line 4—4.
Fig. 5 is an enlarged section taken through Fig. 6 on the line 5—5.
Fig. 6 is an enlarged section taken through Fig. 2 on the line 6—6.
Fig. 7 is a fragmentary front elevation showing an engine cylinder having operating mechanism thereon constructed in accordance with my invention.
Fig. 8 is a disassembled view of each of the separate operating cams.

In detail, the construction illustrated in the drawings comprises a single cylinder unit of an internal combustion engine of the Diesel type. The unit illustrated is so designed that it may be operated as a single unit or with a multiple of cylinders. The operation of a single unit will be described, which obviously will apply to the operation of each other unit of the battery. Each unit consists of the crank case 1, cylinder 2 and cylinder head 3. The cylinder head 3 is provided with three vertical openings 4, 5 and 6 therethrough for housing valve unit structures, comprising, respectively, the air intake valve 7, the exhaust valve 8 and the compressed air inlet 9. The cylinder head is provided with a cored passage 10 communicating the opening 4 with the atmosphere, a cored passage 11 connecting the opening 5 with a suitable exhaust manifold 12, and with a cored passage 13 connecting the compressed air inlet opening 6 with a conduit 14, through which compressed air is adapted to pass. A vertical opening 15 is provided in the head 3 intermediate the openings 4 and 5, within which a fuel inlet valve 16 is adapted to be removably positioned. Guide bearings 17 and 17' are positioned concentrically within the restricted ends of the intake and exhaust openings 4 and 5, guiding the valve stems 18 and 18' centrally within the respective passages 4 and 5. The mushroom heads of the valves 18 and 18' are adapted to rest within the cone-shaped seats provided therefor on the interior face of the cylinder head 3. The stems of the valves project beyond the guide bearings 17 and 17' and are threaded to allow a nut 20 being screwed thereon. In a conventional manner a washer 20' is placed around the valve stem so as to lie in contact with the under face of the nut 20, and a coil expansion spring is interposed between said washer and upper face of the cylinder head to force upwardly on the said valve and keep the head thereof tightly seated. The intake and exhaust valve units 7 and 8 in the respective passages 4 and 5 are of such capacity that a predetermined quantity of air may be readily admitted into and exhausted from said engine cylinder.

The compressed air inlet valve 9 is a self-contained unit and consists of a shouldered bushing 22 adapted to fit within the passage 6 so that the enlarged head 23 thereof will lie in contact with the upper surface of the cylinder head 3. The bushing 22 is drilled centrally to provide a bearing for the valve stem 24, said passage around the valve stem being enlarged adjacent the lower end of the bushing 22 to communicate through a suitable outlet 25 with the conduit 13, through which the compressed air is conveyed. The valve stem 24 is provided with a cone head, seating against a complementary tapered portion provided on the end of the opening 6 within the cylinder, the stem of said valve projecting through the bushing 22 and beyond the enlarged head 23 thereof. A pin 26 is provided on the stem of the valve 9 to allow the interposition of an expansion spring 26' between the bushing 22 and the said projection or pin 26. The expansion spring acts to tightly seat the head of the valve 9 and to prevent air pressure losses. The valve stem 24 is threaded to permit the screwing of a nut 27 thereon.

The valve stems 18 and 18' of the intake and exhaust valve and the valve stem 24 of the compressed air inlet valve are adapted to be operatively engaged by the ends of the rocker arms 27, 28 and 29 respectively. Each of the rocker arms 27, 28 and 29 are provided with bearings 30, 31 and 32 thereon, intermediate the ends thereof and which are adapted to be rotatably mounted on portions of the eccentric shaft 33 supported in bearings 34 and 35 on opposite sides of the upper face of the cylinder head 3. A handle 36 is fixedly secured to one end of the shaft 33, said handle 36 having a spring latch 37 therein adapted to engage notches in a quadrant 38 arranged concentrically to the axis of the shaft 33. Arcuate movement of the handle 36 relative to the quadrant 38 will rotate the shaft 33 proportionately, changing the position and location of the eccentric portions of said shaft so as to place the respective rocker arms 27, 28 and 29 into or out of operating position relative to the intake, exhaust and compressed air inlet valve units 7, 8 and 9 respectively. The opposite ends of the rocker arms 27, 28 and 29 project beyond the side of the cylinder head 3 and the forked ends of the push rods 39, 40 and 41 are pivotally secured thereto. The lower ends of the push rods 39, 40 and 41 project through suitable guide bearings 42, 43 and 44 provided in the crank case 1. Roller members 45, 46 and 47 are secured on the ends of the respective push rods, the roller 45 aligning with and operating on the air intake cam 48, the roller 47 working with the compressed air inlet cam 49 and the roller 46 working with the exhaust cam 50. Each of the cams 48, 49 and 50 are fixedly secured in a predetermined position on the cam shaft 51, rotatably mounted in suitable bearings provided in the crank case 1, said cam shaft being operated in a conventional manner in half-time unison with the crank shaft of said engine, which receives its rotary movement from the reciprocative action of the pistons slidably confined within the cylinders 2. The compressed air inlet cam 49 and the exhaust cam 50 are each provided with a pair of cam projections thereon, located at diametrically opposite points on the peripheries for the purpose to be hereinafter described in detail. The ends of the push rods 39, 40 and 41, adjacent the crank case, are each provided with pins 53 projecting therethrough to confine expansion springs 54 therebetween and the upper face of the crank case 1, to facilitate and increase the efficiency of the push rod action.

The fuel injection valve 16 is a self-contained unit, adapted to deliver fuel into the engine cylinder through a nozzle 54' having suitable spray holes therein. A needle member 55 is arranged within the valve 16 having the tapered end thereof seated within the nozzle 54', closing the spray holes. The opposite end of the said needle projects beyond the valve structure and is threaded to receive the nut 56 or to allow an equivalent projection being attached thereto. Fuel is delivered under pressure from a pump (not shown) to the valve 16 through a conduit 57 connected by a control 58 with the fuel supply line 59. Regulation of the valve connects or disconnects the supply of fuel and the injection valve 16. The type of fuel injection valve used is shown in pending application, Serial No. 467,875 filed May 9, 1921.

The upper face of the cylinder head 3 is provided with a bearing bracket 60 thereon, within which an eccentric shaft 61 is rotatably mounted. The fuel discharge rocker arm 62 is adapted to have the end thereof rotatably secured to the eccentric shaft 61. The eccentric shaft 61 is provided with an arm 63 thereon, pivotally connected through a link or lever 64 to an arm 65 fixedly secured on the eccentric shaft 33. Partial rotation of the shaft 33 by the handle 36 transmits a proportionate rotative movement through the arm 65, lever 64 and arm 63 to the eccentric shaft 61, accomplishing a lowering or raising of the end of the rocker arm 62. The opposite end of the rocker arm 62 is pivotally connected through a yoke 66 to a push rod 67. The lower end of the push rod 67 projects through a suitable bearing 68 provided in the crank case 1, said push rod having a roller member 69 on the end thereof adapted to contact with the fuel valve discharge cam 70, fixedly mounted on the cam shaft 51.

A slot or opening 71 is provided in the rocker arm 62 intermediate its ends, which opening registers with the projecting end of the needle 55 of the fuel discharge valve 16. A slotted washer 72 is adapted to rest on the upper face of the rocker arms 62 so that the slotted portion of said washer will pass around the needle 55. The upper face of the washer 72 is adapted to be positioned out of contact with the under face of the nut or projection 56 on the needle valve 55. Movement of the handle 36 through the connected eccentric shafts 33 and 61 raises or lowers the rocker arm 62 so that the face of the washer 72 moves relative to the nut 56. When the rocker arm 62 is placed in the lower or inoperative position, the washer 72 will be lowered away from the valve stem projection, whereby reciprocating movement of the rocker arm 62 will not be imparted to the valve stem 55. Placing the rocker arm 62 in the operative position, by raising it relative to the projection 56 on the needle 55, the washer 72 may be placed into contact with the said projection 56 when an elevating movement is applied to the rocker arm 62 by the push rod 67. The lift of the push rod 67 through the rocker arm 62 raises the needle 55 of the valve 16, permitting a charge of fuel under pressure to be discharged into the engine cylinder.

The assembled engine operates in the following manner. The handle 36 would be placed in the dotted position shown in Fig. 2, which is the inoperative or starting position. Each cylinder would have the handle 36 so positioned that the rocker arm 29, mounted on the eccentric shaft 33, would depress the valve 9 and permit a charge of compressed air to pass from the line 14, through the passage 13 and port 6 into the engine cylinder, forcing the engine piston downwardly. Experiments and tests have proven that forty (40) pounds of air pressure is sufficient for starting operation of the engine. In the starting position, the double cam projections on the cam 49 act to admit a charge of air into the cylinder on each downward stroke of the piston and, correspondingly, the double projections on the exhaust cam 50 act to permit an exhausting of the air from the cylinder on each upward stroke of the piston in said cylinder. In the starting position, the compressed air inlet valve 9 and the exhaust valve 18' open and close in relation to the up and down stroke of the piston. The exhaust valve 18' opens after the up stroke of the piston has commenced so that the charge of compressed air within the cylinder will be slightly recompressed and slightly heated. After a charge of compressed air has been admitted into each cylinder and rotation of the crank shaft and cam shafts commenced, the handle 36 would be swung over into the opposite position on the quadrant 38, partially rotating the eccentric shaft 33 and instantly throwing the rocker arm 29 and its cam 49 completely out of operation and eliminating the functioning of one of the projections on the exhaust cam 50. Movement of the eccentric shaft 33 moves the eccentric shaft 61 of the rocker arm 62 whereby the air intake rocker arm 27, fuel valve rocker arm 62 and exhaust rocker arm 28 operate in proper "four-cycle" order. A charge of air is thus drawn into the engine cylinder by a down stroke of the piston, compressed on the following up stroke of said piston and heated thereby. In the commencement of the next down stroke of the piston, the fuel inlet valve 16 opens to admit a charge of fuel into the engine cylinder, so that combustion takes place the moment that the fuel comes in contact with the heated air charge. After the completion of the "firing" cycle or down stroke of the piston, the "exhaust" cycle follows, wherein all of the spent gases of combustion are exhausted past the exhaust valve 18', opened by the rocker arm 28.

Having thus described this invention, what I claim and desire to secure by Letters Patent is:

1. In combination with an internal combustion engine having air intake and exhaust valves therein, of a fuel inlet valve in said engine; a compressed air inlet valve in said engine; an eccentric shaft rotatably journaled on said engine; rocker arms pivotally mounted on said eccentric shaft for actuating each of said valves; and means to move said eccentric shaft supporting the rocker arms to operate said compressed air inlet valve and exhaust valve independently of said air intake, exhaust and fuel inlet valves.

2. In combination with an internal combustion engine having air intake and exhaust valves therein, of a fuel inlet valve in said engine; a compressed air inlet valve in said engine; an eccentric shaft rotatably journaled on said engine; rocker arms pivotally mounted on said eccentric shaft for actuating each of said valves; and means to move the eccentric shaft supporting said rocker arms to operate said compressed air inlet valve and exhaust valve at double the normal operating speed of said air intake and fuel inlet valves.

3. In combination with an internal combustion engine having air intake and exhaust valves therein, of a fuel inlet valve in said engine; a compressed air inlet valve in said engine; an eccentric shaft rotatably journaled on said engine; rocker arms pivotally mounted on said eccentric shaft for actuating each of said valves; and means to move the eccentric shaft supporting said rocker arms to operate said air intake, fuel inlet and exhaust valves interchangeably with said compressed air inlet and exhaust valves, and at different operating speeds.

4. In combination with an internal combustion engine having air intake and exhaust valves therein, of a fuel inlet valve in said engine; a compressed air inlet valve in said engine; an eccentric shaft rotatably journaled on said engine; rocker arms pivotally mounted on said eccentric shaft for actuating each of said valves; and means to move the eccentric shaft supporting said rocker arms to operate said air intake, fuel inlet and exhaust valves interchangeably with and at one-half the operating speed of said compressed air inlet and exhaust valves.

5. An internal combustion engine comprising a cylinder having air intake, fuel inlet, exhaust and compressed air inlet valves therein; an eccentric shaft rotatably journaled on said engine; rocker arms pivoted on said eccentric shaft and adapted to actuate said valves; and means for moving said eccentric shaft to render said air intake and inlet valves inoperative, and to operate said compressed air inlet and exhaust valves independently of and at double the normal operating speed of said air intake and fuel inlet valves.

6. An internal combustion engine comprising a cylinder having air intake fuel inlet, exhaust and compressed air inlet valves therein; an eccentric shaft rotatably journaled on said engine; rocker arms eccentrically pivoted on said shaft and adapted to actuate said valves; means for moving said eccentric shaft and rocker arms to render said air intake and fuel inlet valves inoperative and to operate said compressed air inlet and exhaust valves at twice the normal operating speed of said air intake and fuel inlet valves; and means for changing the position of said rocker arm to render said compressed air inlet valve inoperative and to operate said air intake, fuel inlet and exhaust valves at one-half the speed and independently of said compressed air inlet valve.

7. An internal combustion engine comprising a cylinder having air intake, fuel inlet, exhaust and compressed air inlet valves therein; a piston reciprocatable within said cylinder; an eccentric shaft rotatably journaled on said engine; rocker arms eccentrically pivoted on said shaft and adapted to actuate said valves; means for operating said rocker arms in synchronism with said piston; means for moving said eccentric shaft and rocker arms to actuate said compressed air inlet and exhaust valves to admit a charge of compressed air into and to exhaust said air from said cylinder on each downward and upward stroke of said piston; means for changing the positions of said rocker arms to render said compressed air inlet valve inoperative and to actuate said air intake and exhaust valves to admit a charge of air into and to exhaust from said engine cylinder on each alternate downward and alternate upward stroke of said piston; and means for actuating said fuel inlet valve on the intermediate downward stroke of said piston.

8. An internal combustion engine comprising a cylinder having air intake, fuel inlet, exhaust and compressed air inlet valves therein; a piston reciprocatable within said cylinder; an eccentric shaft rotatably journaled on said engine; rocker arms eccentrically pivoted on said shaft and adapted to actuate said valves; means for operating said rocker arms in synchronism with said piston; means for moving said eccentric shaft and rocker arms to actuate said compressed air inlet and exhaust valves to operate said engine as a "two-cycle" engine; and means for changing the position of said eccentric shaft and rocker arms to actuate said air intake, fuel inlet and exhaust valves to operate said engine as a "four-cycle" engine.

9. An internal combustion engine comprising a cylinder having air intake, fuel inlet, exhaust and compressed air inlet valves therein; a piston reciprocatable in said cylinder; an eccentric shaft rotatably mounted on said cylinder; an operating handle secured to said shaft; rocker arms rotatably mounted on said eccentric shaft and adapted to be moved into and from operating position relative to said compressed air inlet and exhaust cylinder valves by movement of said eccentric shaft handle in one direction; means to move said rocker arms into and from operating position relative to said air intake, fuel inlet and exhaust valves, by movement of said handle in the opposite direction; and means for operating said rocker arms in synchronism with said piston.

10. An internal combustion engine comprising a cylinder having air intake, fuel inlet, exhaust and compressed air inlet valves therein; a piston reciprocatable in said cylinder; an eccentric shaft rotatably mounted on said cylinder; an operating handle secured to said shaft; rocker arms rotatably mounted on said cylinder and adapted to be reciprocated in unison with said piston; and means for changing the position of said rocker arms by movement of said eccentric shaft to operate said air intake, fuel inlet and exhaust valves interchangeably and at one-half the normal operating speed of said compressed air inlet and exhaust valves.

In testimony whereof, I have hereunto set my hand at San Francisco, California, this 12th day of July, 1922.

AXEL WARENSKJOLD.

In presence of—

LINCOLN V. JOHNSON.